(12) United States Patent
Yilmaz

(10) Patent No.: US 12,179,901 B2
(45) Date of Patent: Dec. 31, 2024

(54) TAIL FOLDING MECHANISM

(71) Applicant: TUSAS-TURK HAVACILIK VE UZAY SANAYII ANONIM SIRKETI, Ankara (TR)

(72) Inventor: Furkan Yilmaz, Ankara (TR)

(73) Assignee: TUSAS-TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 0 days.

(21) Appl. No.: 18/521,491

(22) Filed: Nov. 28, 2023

(65) Prior Publication Data

US 2024/0174338 A1    May 30, 2024

(30) Foreign Application Priority Data

Nov. 30, 2022    (TR) .................. 2022/018273

(51) Int. Cl.
- *B64C 1/06*    (2006.01)
- *B64C 27/04*   (2006.01)
- *B64C 3/56*    (2006.01)

(52) U.S. Cl.
CPC .............. *B64C 1/063* (2013.01); *B64C 27/04* (2013.01); *B64C 3/56* (2013.01)

(58) Field of Classification Search
CPC ........... B64C 1/063; B64C 27/04; B64C 3/56; B64C 27/82
See application file for complete search history.

(56) References Cited

U.S. PATENT DOCUMENTS

| | | | | |
|---|---|---|---|---|
| 5,186,573 A | * | 2/1993 | Flotow | F16D 1/101 464/169 |
| 5,672,112 A | * | 9/1997 | Sbabo | F16D 3/185 464/177 |
| 6,050,521 A | * | 4/2000 | Regonini | B64C 1/063 464/154 |
| 6,168,530 B1 | * | 1/2001 | Guimbal | B64D 35/00 464/178 |
| 7,771,126 B2 | * | 8/2010 | Faass | F16C 19/18 248/580 |
| 10,287,005 B2 | * | 5/2019 | Spears | F16C 32/0425 |

FOREIGN PATENT DOCUMENTS

CN    114455061 A    *    5/2022

OTHER PUBLICATIONS

CN 114455061 A (Year: 2022).*

* cited by examiner

*Primary Examiner* — Brian M O'Hara

(74) *Attorney, Agent, or Firm* — Notaro, Michalos & Zaccaria P.C.

(57) ABSTRACT

A folding mechanism for a tail located on a helicopter has a front region on the tail, a rear region connected to the front region can be folded around the axis on which it is supported, a first shaft located on the front region and a second shaft located on the rear region enables power to be transmitted to the tail rotor during the flight movement of the helicopter, a first coupling and a second coupling located on the first shaft with a threaded form, a first hub located on the first shaft surrounding the first coupling all around and is form-fitting to the first coupling to enable the first coupling to make at least a partial spherical rotational movement, and a second hub located on the second shaft is arranged opposite the second coupling and being form-fitting to the second coupling with a dampener located on the front region.

15 Claims, 3 Drawing Sheets

TAIL FOLDING MECHANISM

CROSS-REFERENCE

This application claims the benefit of priority to Turkish Patent Application No. 2022/018273, filed Nov. 30, 2022, which is incorporated herein by reference in its entirety.

FIELD

This invention relates to tail mechanisms that can be folded to take up less space during the transportation of helicopters.

During the transportation of helicopters, the tail cone and main rotors are folded in order to take up less space on the ship. The main rotor is folded from the hinges located at the hub connection. The tail cone, in turn, is folded perpendicular or somewhat angular to the horizontal axis at a horizontal line where through the tail's powertrain passes. While this folding operation is taking place, the tail transmitting power to the tail rotor is decoupled from the folding axis of the power transmission line. And when the tail is restored, the coupling is provided back. For this decoupling and coupling mechanism, a type of coupling commonly referred to as "face gear" is used. However, this type of coupling has disadvantages such as alignment, low reliability, limited flexibility, low load bearing capacity and short maintenance intervals. In order to eliminate these drawbacks to a large extent, the so-called "spline" gear design can be used. The tail folding mechanism comprises a hinge on the body. The tail is folded by rotating around this hinge. This hinge enables the rear tail cone to be folded downward as much as the angle it makes with the horizontal axis. Thus, the tail rotor is prevented from hitting the ship's ceiling.

BACKGROUND

The United States patent document U.S. Pat. No. 6,050,521, which is included in the known state of the art, describes a helicopter comprising a main rotor with foldable blades along the body of the helicopter and a tail rotor carried by a tail section that can be folded with respect to the body. In said invention, the sleeve is maintained in a limit axial position defined by inner teeth contacting the guide ring and by a helical spring coaxial with the shaft. It is compressed between an outer intermediate shoulder of said sleeve and an annular supporting element fitted to the shaft and axially contacting gear.

SUMMARY

Thanks to a tail folding mechanism developed with the present invention, a simple and efficient tail folding mechanism is provided without damaging the helicopter parts.

A further object of the present invention is to enable tail folding using a lighter mechanism in helicopters.

A further object of the present invention is to provide a helicopter tail folding mechanism in a more efficient, practical and economical manner.

The tail folding mechanism realized to achieve the object of the invention, defined in the first claim and in the claims dependent on this claim, comprises a tail as is provided in rotary wing air vehicles, a front region in the tail and a rear region rotatably arranged around the axis of the point at which it is supported on the front region. There is a first shaft in the front region that transmits power simultaneously to the tail rotor during the flight of the rotary wing air vehicle, and a second shaft transmitting power in the rear region. A first coupling on the first shaft is in a threaded form and there is a second coupling almost adjacent thereto. A first hub surrounds the first coupling all around in such a way that it can rotate at least partially, and is form-fitting to the first coupling. A second hub is located on the second shaft, is form-fitting to the first hub and is positioned opposite the second coupling. Dampener is located in the front region and has a damping function. An active mode (A) is the mode in which the first shaft is coupled to the second shaft and power is transmitted from the first shaft to the second shaft when the second coupling engages into the second hub. Passive mode (P) is the mode in which the first shaft and the second shaft are decoupled and no motion is transmitted as a result of the rear region being rotated and moved around the axis on which it is supported.

The tail folding mechanism according to the invention comprises dampener in contact with the first hub, damping the linear forward and backward movement of the first hub into the first shaft towards the front region while the first hub is brought from the passive mode (P) to the active mode (A).

In an embodiment of the invention, the tail folding mechanism comprises a mouth in a region on the first shaft where the first shaft is coupled to the main rotor. When the front region is switched from the passive mode (P) to active mode (A), the second hub slidingly moves from the teeth of the second coupling. The dampener slows down the movement of the first hub towards the mouth.

In an embodiment of the invention, the tail folding mechanism comprises a socket located on the first hub, extending into the first shaft, surrounding the dampener at least partially all around and supporting the dampener.

In an embodiment of the invention, the tail folding mechanism comprises dampener that moves forward in the direction extending to the rear region in the direction extending from the first shaft to the first coupling while the front region is brought from the active mode (A) to the passive mode (P), or narrows towards the mouth and thus gets compressed in the direction in which it extends from the first shaft to the first coupling while it is brought from the passive mode (A) to the active mode (A), thereby relieving the load on the front region.

In an embodiment of the invention, the tail folding mechanism comprises a stopper located close to the mouth so as to limit the movement of the dampener in the first shaft, having the same form as the cross-sectional area of the first shaft and limiting the linear movement of the socket.

In an embodiment of the invention, the tail folding mechanism comprises a transmission element that extends monolithically so that the axis in which the first hub extends towards the first shaft is the center point and forms the inner wall of the first shaft and surrounds the dampener at least partially all around.

In an embodiment of the invention, the tail folding mechanism comprises fastener that centers and holds together the first coupling and the second coupling and enables to mount pin so that the dampener can be moved together with the first coupling.

In an embodiment of the invention, the tail folding mechanism comprises at least one shoulder located on the socket, stopping the movement of the fastener in the socket and enabling to keep it stationary in the socket so that it enables its linear movement to be dampened almost completely.

In one embodiment of the invention, the tail folding mechanism comprises a nut that enables a user to easily access the first coupling while in passive mode (P) during maintenance as a result of the first coupling being mounted to the pin in a removable manner.

In an embodiment of the invention, the tail folding mechanism comprises fastener having a conical form so that it can engage the inner wall of the socket.

In an embodiment of the invention, the tail folding mechanism comprises dampener in the form of a wave spring.

In an embodiment of the invention, the tail folding mechanism comprises a sealing element located between the first coupling and the second coupling, preventing the entry of foreign substances such as dust, water etc. into the first shaft.

In an embodiment of the invention, the tail folding mechanism comprises a first suspension bearing that surrounds the transmission element all around and enables the first shaft to be placed and supported on the front region, a second suspension bearing that connects the second hub to the rear region.

In one embodiment of the invention, the tail folding mechanism comprises a hinge that connects the first suspension bearing to the second original bearing and enables the second suspension bearing to rotate around itself on the axis to which it is connected.

In an embodiment of the invention, the tail folding mechanism comprises first coupling that is monolithic manner to second coupling.

DESCRIPTION OF THE DRAWINGS

The tail folding mechanism realized to achieve the object of the present invention is shown in the accompanying figures, wherein.

Figure 1:
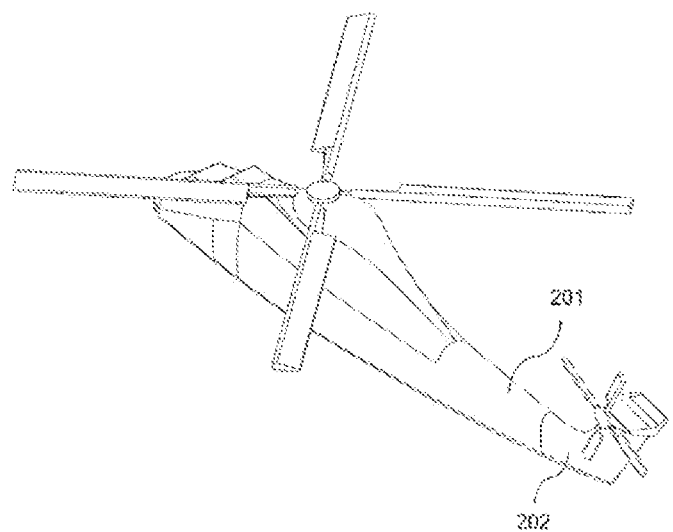
FIG. 1 is a perspective view of the front region and the back region in active mode (A).

The parts in the figures are individually designated as following.

1. Tail folding mechanism
2. Tail
201. Front region
202. Rear region
3. First shaft
4. Second shaft
5. First coupling
6. Second coupling
7. First hub
8. Second hub
9. Dampener
10. Mouth
11. Socket
12. Stopper
13. Transmission element
14. Pin
15. Shoulder
16. Nut
17. Sealing element
18. First suspension bearing
19. Second suspension bearing
20. Hinge (A) Active mode
(P) Passive mode
(S) Fastener

DETAILED DESCRIPTION

The tail folding mechanism (1) comprises a tail (2) located on the helicopter, a front region (201) located on the tail (2), a rear region (202) connected to the front region (2) in such a way that it can be folded around the axis on which it is supported, a first shaft (3) located on the front region (201) and a second shaft (4) located on the rear region (202) enabling power to be transmitted to the tail (2) rotor during the flight movement of the helicopter, a first coupling (5) and a second coupling (6) located on the first shaft (3) both with a threaded form, a first hub (7) located on the first shaft (3), surrounding the first coupling (5) all around and is form-fitting to the first coupling (5) preferably with a crown form so as to enable the first coupling (5) to make at least a partial spherical rotational movement, a second hub (8) located on the second shaft (4) so as to be arranged opposite the second coupling (6) and being form-fitting to the second coupling (6), a dampener (9) located on the front region, an active mode (A) in which power is transmitted from the first shaft (3) to the second shaft (4) by the placement of the second coupling (6) in the second hub (8), a passive mode (P) in which power transmission from the first shaft (3) to the second shaft (4) is interrupted when the second coupling (6) is decoupled from the second hub (8) by the folding movement of the rear region (202).

The tail folding mechanism (1) according to the invention comprises dampener (9) located in the first shaft (3) so as to be in contact with the first hub (7), dampener (9) that enables the movement of the first hub (7) into the first shaft (3) to be at least partially dampened, thus dampens the linear movement of the first hub (7) while it is switched from the passive mode (P) to the active mode (A).

There is a front region (201) on the helicopter tails (2) close to the main rotor and a rear region (202) that is able to connect to the front region (201) so as to be rotatable around the axis in which it is connected to the front region. A first shaft (3) transmitting power to the helicopter rotor during its flight is located in the front region (201), a second shaft (4) transmitting motion is located in the rear region (202). A first coupling (5) having a threaded form and a second coupling (6) having a threaded form are located on the first shaft (3). There is a first hub (7) located on the first shaft (3) that surrounds the first coupling (5) so as to be form-fitting to it and enables the first coupling (5) to make a spherical rotational movement around its center, and a second hub (8) located on the second shaft (4) so as to be against and form-fitting to the second coupling (6). Dampener (9) is located in the front region (201) and dampens the linear movement by getting compressed. As a result of the placement of the second hub (8) in the second coupling (6), there is an active mode (A) in which the first shaft (3) and the second shaft (4) provide power transmission. There is a passive mode (P) in which the rear region (202) is rotated around the axis on which it is supported and moved away from the front region (201) and the second coupling (6) and the second hub (8) are decoupled.

Figure 2:
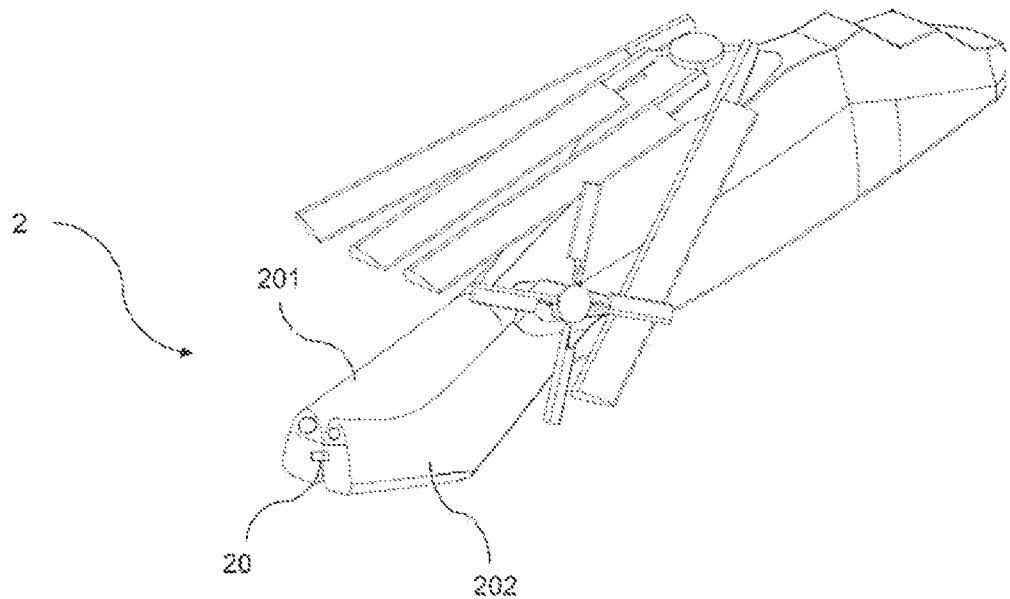
FIG. 2 is a perspective view of the front region and the back region in passive mode (P).

The dampener (9) is located in contact with the first hub (7) and the first shaft (3). The dampener (9) located positionally behind the first hub (7) dampens the movement of the first hub (7) towards the first shaft (3). Thus, the dampener (9) efficiently dampens the linear movement of the first hub (7) while the it is brought from the passive mode (P) to the active mode (A) and prevents the system from being stuck and enables the folding process to be easily carried out. (FIG. 1, FIG. 2)

In an embodiment of the invention, the tail folding mechanism (1) comprises a mouth (10) on the side of the first shaft (3) where it is connected to the helicopter main rotor, dampener (9) that at least partially dampens the movement of the first hub (7) towards the mouth (10) during when the second hub (8) slides from the teeth of the second coupling (6) and gets placed in the first hub (7) while the front region (201) is brought from the passive mode (P) to the active mode (A) by a user. A mouth (10) is located in the region of the first shaft (3) where it is connected to the helicopter main rotor. While the user brings the front region (201) from the passive mode (P) to the active mode (A), the second hub (8) moves in the gear path of the second coupling (6) and the dampener (9) dampens the movement of the second hub in the direction of the mouth (10) during its placement in the first hub (7). Thanks to this, the system is prevented from getting stuck and the coupling between the second coupling (6) and the first coupling (5) is easily enabled.

In an embodiment of the invention, the tail folding mechanism (1) comprises a socket (11) located on the first hub (7) so as to extend into the first shaft (3), contacting the inner wall of the first shaft (3), at least partially surrounding the dampener (9) all around, enabling the dampener (9) to be supported. The socket (11) is located on the first hub (7) so as to extend into the first shaft (3). The socket (10) contacts the inner wall of the first shaft (3). The socket (10) at least partially surrounds and supports the dampener (9). Thanks to this, the dampener (9) can efficiently dampen the linear movement of the first coupling (5).

In an embodiment of the invention, the tail folding mechanism (1) comprises dampener (9) that moves forward towards the rear region (202) in the direction in which it extends from the first shaft (3) to the first coupling (5) while it is switched from the active mode (A) to the passive mode (P) or gets compressed towards the mouth (10) in the direction in which it extends from the first shaft (3) to the first coupling (5) while it is brought from the passive mode (P) to the active mode (A) to at least partially dampen the load transferred to the front region (201). The dampener (9) at least partially reduces the load transferred to the front region (201) thanks to the fact that it moves from the direction in which the first shaft (3) extends towards the rear region (202) during the transition from the active mode (A) to the passive mode (P) or gets compressed towards the mouth (10) in the direction in which the first shaft (3) extends during the transition from the passive mode (A) to the active mode (A).

Figure 3:
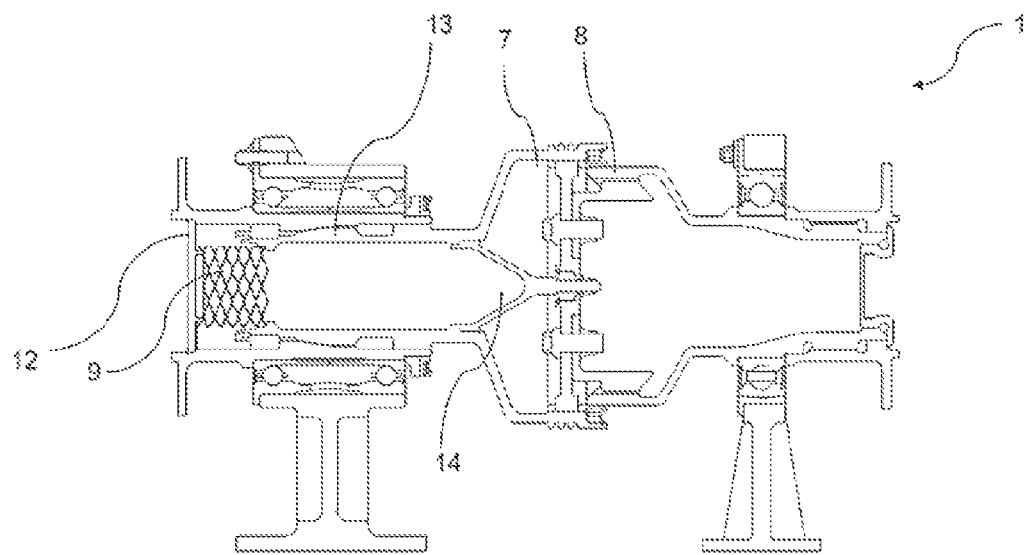
FIG. 3 is a cross-sectional view of the tail folding mechanism in active mode (A).

In an embodiment of the invention, the tail folding mechanism (1) comprises a stopper (12) that enables the dampener (9) to be mounted so as to limit its movement into the first shaft (3), is form-fitting to the cross-sectional area of the first shaft (3), is located in a region close to the mouth (10) and limits the movement of the socket (11). The holder (12) is form-fitting to the cross-sectional area of the first shaft (3) and enables the dampener (11) to be mounted to the first shaft (3) so as to restrict its movement. Thanks to this, the dampener (9) is disposed in a stationary way and performs the damping process. The stopper (12) is located on the first shaft in the region close to the mouth (10) and limits the movement of the socket (11). (FIG. 3)

In an embodiment of the invention, the tail folding mechanism (1) comprises a transmission element (13) that extends monolithically from the first hub (7) so that the axis in which the first shaft (3) extends is the center and forms the inner wall of the first shaft (3) and surrounds the dampener (9) at least partially all around. The transmission element (13) that at least partially surrounds the dampener (9) all around extends so as to form a whole so that the axis in which the first shaft (3) extends is the center, has a helical form and forms the inner wall of the first shaft (3). Thanks to this, the transmission element (13) supports the damping function of the dampener (9) with its outer helical form. (FIG. 3)

In an embodiment of the invention, the tail folding mechanism (1) comprises a pin (14) located in the socket (11), centering the first coupling (5) and the second coupling (6), fastener (S) enabling to mount the pin (14) to the socket (11) so that the dampener (9) and the first coupling (5) can be moved together. The pin (14) is located in the socket (11) so as to center the first coupling (5) and the second coupling (6). The fastener (S) enables to mount the pin (14) onto the socket (11) so that the dampener (9) and the first coupling (5) can be moved together. Thanks to this, it is ensured that the first coupling (5) and the second coupling (6) overlap correctly and effectively during tail folding. (FIG. 3)

Figure 5:
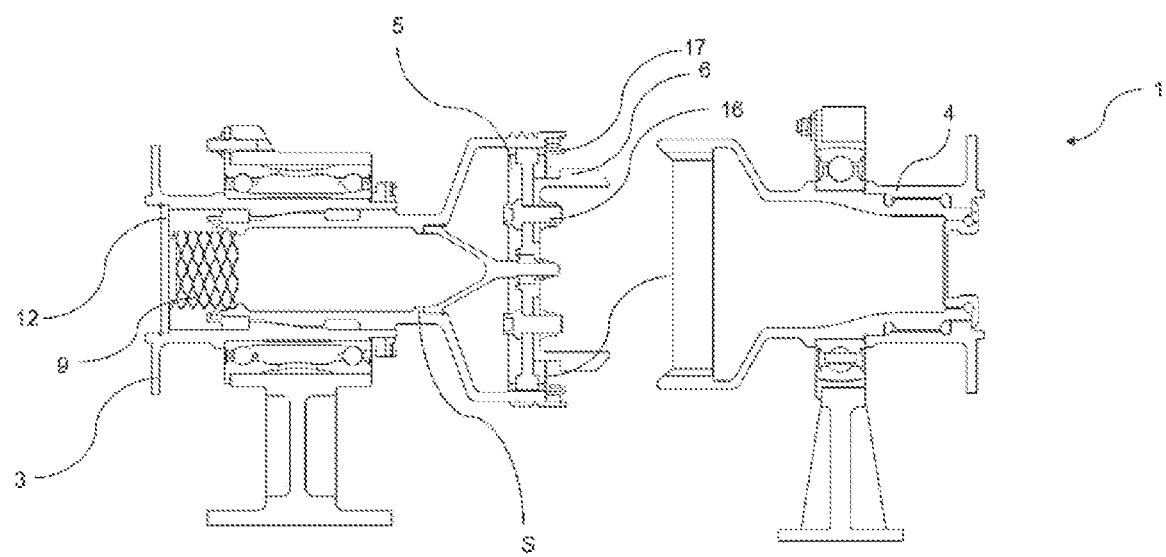
FIG. 5 is a cross-sectional view of the tail folding mechanism in passive mode (P).

In an embodiment of the invention, the tail folding mechanism (1) comprises at least one shoulder (15) in the form of a protrusion located on the socket (11), preventing the movement of the fastener (S) on the socket (11), making stationary the position of the dampener (9) in the socket (11), thus ensuring an almost complete linear motion damping. The shoulder (15) prevents the dampener (9) from getting out of the socket (11) during the damping movement and the socket (11) from becoming dislodged. Thanks to this, the shoulder (15) helps to dampen the linear movement. (FIG. 5)

In an embodiment of the invention, the tail folding mechanism (1) comprises at least one nut (16) removably mounted to the pin (14) for the assembly/disassembly of the first coupling (5) and located on the second coupling (6) so that it can be directly accessed by a user in the passive mode (P). Thanks to the pin (14) that is connected to the nut (16), the first coupling (5) and the second coupling (6) are detachably mounted to each other in a concentric manner.

In an embodiment of the invention, the tail folding mechanism (1) comprises fastener (S) having a conical form so that it can engage the inner wall of the socket (11). The fastener (S) enables to mount the pin (14) onto the socket (11) so that the dampener (9) and the first coupling (4) can be moved together. Thanks to this, it is ensured that the first coupling (4) and the second coupling (5) overlap correctly and effectively during tail folding.

In an embodiment of the invention, the tail folding mechanism (1) comprises dampener (9) in the form of a wave spring, thus providing more efficient damping at a shorter distance. Thanks to the dampener (9) in the form of a wave spring, more efficient damping is ensured at a shorter distance.

In an embodiment of the invention, the tail folding mechanism (1) comprises a sealing element (17) located between the first coupling (4) and the second coupling (5), acting as a seal and preventing the entry of foreign substances such as water and dust into the first shaft (3). Thanks to the sealing element (17), it is ensured that foreign substances such as water and dust are prevented from entering the first shaft (3).

Figure 4:
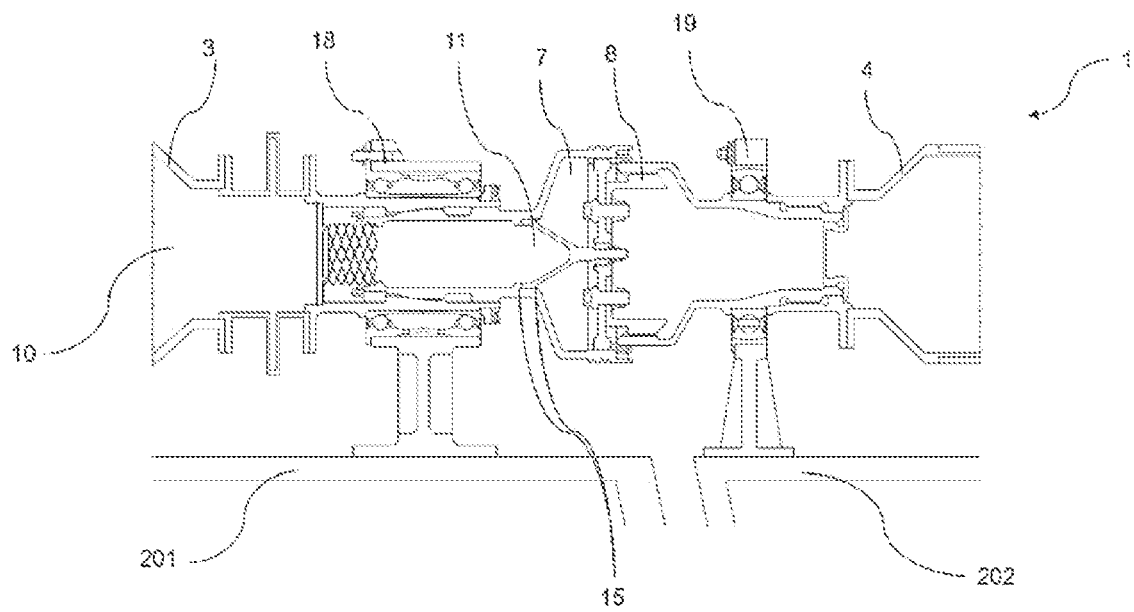
FIG. 4 is a cross-sectional view of the tail folding mechanism in active mode (A).

In an embodiment of the invention, the tail folding mechanism (1) comprises first shaft (3) surrounding the transmission element (13), a first suspension bearing (18) enabling to mount the first shaft (3) to the front region (201), and a second suspension bearing (19) enabling to mount the second hub (8) to the rear region (202). Thanks to this, the tail folding mechanism (1) is coupled to and supported by the helicopter body. (FIG. 4)

In one embodiment of the invention, the tail folding mechanism (1) comprises a hinge (20) that connects the first suspension bearing (18) and the second original bearing (19) to each other and enables the second suspension bearing (19) to rotate and move around the axis on which it is connected. Thanks to this, the front region (201) and the rear region (202) are easily folded.

In an embodiment of the invention, the tail folding mechanism (1) comprises monolithically produced first coupling (5) and second coupling (6). A lighter helicopter tail folding mechanism (1) is provided thanks to the tail (2) whose size is shortened by the monolithic production of the first coupling (5) and the second coupling (6).

What is claimed is:

1. A tail folding mechanism (1) comprising:
    a tail (2) located on a helicopter,
    a front region (201) located on the tail (2),
    a rear region (202) connected to the front region (2) in such a way that it can be folded around an axis on which it is supported,
    a first shaft (3) located on the front region (201) and a second shaft (4) located on the rear region (202) enabling power to be transmitted to a tail rotor during flight movement of the helicopter,
    a first coupling (5) and a second coupling (6) located on the first shaft (3), both with a threaded form,
    a first hub (7) located on the first shaft (3) and surrounding the first coupling (5) all around, the first hub (7) form-fitting to the first coupling (5) so as to enable the first coupling (5) to make at least a partial spherical rotational movement,
    a second hub (8) located on the second shaft (4) so as to be arranged opposite the second coupling (6) and being form-fitting to the second coupling (6),
    a dampener (9) located on the front region,
    wherein the folding mechanism is configured to have:
        an active mode (A) in which power is transmitted from the first shaft (3) to the second shaft (4) by placement of the second coupling (6) in the second hub (8),
        a passive mode (P) in which power transmission from the first shaft (3) to the second shaft (4) is interrupted when the second coupling (6) is decoupled from the second hub (8) by folding movement of the rear region (202), wherein the dampener (9) is located in the first shaft (3) so as to be in contact with the first hub (7), and enabling the movement of the first hub (7) into the first shaft (3) to be at least partially dampened, thereby damping linear movement of the first hub (7) while it is switched from the passive mode (P) to the active mode (A).

2. The tail folding mechanism (1) according to claim 1, comprising a mouth (10) on a side of the first shaft (3) where the shaft is connected to a helicopter main rotor, and wherein the dampener (9) is configured to dampen the movement of the first hub (7) towards the mouth (10) when the second hub (8) slides from teeth of the second coupling (6) and gets placed in the first hub (7) while the front region (201) is brought from the passive mode (P) to the active mode (A) by a user.

3. The tail folding mechanism (1) according to claim 1, comprising a socket (11) located on the first hub (7) so as to extend into the first shaft (3), contacting an inner wall of the first shaft (3), at least partially surrounding the dampener (9) all around, and enabling the dampener (9) to be supported.

4. The tail folding mechanism (1) according to claim 2, wherein the dampener (9) is configured to move forward towards the rear region (202) in a direction from the first shaft (3) to the first coupling (5) while being switched from the active mode (A) to the passive mode (P) or becomes compressed towards the mouth (10) in the direction from the first shaft (3) to the first coupling (5) while the dampener is brought from the passive mode (P) to the active mode (A), thereby at least partially damping a load transferred to the front region (201).

5. The tail folding mechanism (1) according to claim 3, comprising a stopper (12) enabling the dampener (9) to be mounted so as to limit its movement into the first shaft (3), the stopper (12) being form-fitting to a cross-sectional area of the first shaft (3), and the stopper (12) located in a region close to a mouth (10) and limiting the movement of the socket (11).

6. The tail folding mechanism (1) according to claim 1, comprising a transmission element (13) extending monolithically from the first hub (7) so that the axis in which the first shaft (3) extends is the center axis, forming an inner wall of the first shaft (3), and surrounding the dampener (9).

7. The tail folding mechanism (1) according to claim 3, comprising a pin (14) located in the socket (11), centering the first coupling (5) and the second coupling (6), and enabling the pin (14) to be mounted to the socket (11) so that the dampener (9) and the first coupling (5) can be moved together.

8. The tail folding mechanism (1) according to claim 3, comprising at least one shoulder (15) in the form of a protrusion located on the socket (11), preventing the movement of a fastener(S) on the socket (11), making stationary a position of the dampener (9) in the socket (11), thus ensuring an almost complete linear motion damping.

9. The tail folding mechanism (1) according to claim 7, comprising at least one nut (16) removably mounted to the pin (14) for assembly/disassembly of the first coupling (5) and being located on the second coupling (6) so that it can be directly accessed by a user in the passive mode (P).

10. The tail folding mechanism (1) according to claim 3, comprising a fastener(S) having a conical form so that it can engage the inner wall of the socket (11).

11. The tail folding mechanism (1) according to claim 1, wherein the dampener (9) comprises a wave spring.

12. The tail folding mechanism (1) according to claim 1, comprising a sealing element (17) located between the first coupling (5) and the second coupling (6), acting as a seal and preventing entry of foreign substances such as water and dust into the first shaft (3).

13. The tail folding mechanism (1) according to claim 6, wherein:
    the first shaft (3) surrounds the transmission element (13),
    a first suspension bearing (18) enabling the first shaft (3) to be mounted to the front region (201), and
    a second suspension bearing (19) enabling the second hub (8) to be mounted to the rear region (202).

14. The tail folding mechanism (1) according to claim 13, comprising a hinge (20) connecting the first suspension bearing (18) and the second suspension bearing (19) to each other and enabling the second suspension bearing (19) to be rotated and moved around the axis on which it is connected.

15. The tail folding mechanism (1) according to claim 1, wherein the first coupling (5) and the second coupling (6) are produced monolithically.

* * * * *